United States Patent [19]

Smith et al.

[11] Patent Number: 5,377,236
[45] Date of Patent: Dec. 27, 1994

[54] METHOD AND APPARATUS FOR MEASURING ROD END SQUARENESS

[75] Inventors: David G. Smith, Leland; Kurt D. Ellis, Wilmington; Harold B. King, Jr., Wrightsville Beach; David K. Underwood, Stokesdale, all of N.C.

[73] Assignee: General Electric Company, San Jose, Calif.

[21] Appl. No.: 46,291

[22] Filed: Apr. 15, 1993

[51] Int. Cl.$^5$ ............................................. G21C 17/00
[52] U.S. Cl. ..................................... 376/258; 376/245
[58] Field of Search .................. 376/245, 260, 258; 33/535

[56] References Cited

U.S. PATENT DOCUMENTS

| | | | |
|---|---|---|---|
| 3,443,317 | 5/1969 | Grahman | 876/245 |
| 4,138,821 | 2/1979 | Wilks | 33/174 Q |
| 4,155,648 | 5/1979 | Ferguson | 356/140 |
| 4,274,205 | 6/1981 | Starr et al. | 33/174 |
| 4,324,049 | 4/1982 | Blose | 33/199 |
| 4,326,336 | 4/1982 | Hreha | 33/174 Q |
| 4,347,652 | 9/1982 | Cooper, Jr. et al. | 29/407 |
| 4,571,084 | 2/1986 | Wright | 356/391 |

OTHER PUBLICATIONS

Beyer, "CRC Standard Mathematical Tables," 1973, pp: cover, copyright, and 259.

Primary Examiner—Donald P. Walsh
Assistant Examiner—Meena Chelliah
Attorney, Agent, or Firm—J. E. McGinness

[57] ABSTRACT

A method and apparatus measure squareness of an end of a rod relative to a longitudinal centerline axis thereof without requiring rotation of the rod. The apparatus includes a flat plate mounted substantially perpendicularly to the rod centerline axis. The method positions the plate in abutting contact with the rod end, and a tilt angle of the plate in abutting contact with the rod end is measured for determining squareness of the rod end.

9 Claims, 4 Drawing Sheets

METHOD AND APPARATUS FOR MEASURING ROD END SQUARENESS

The present invention relates generally to measurement devices, and, more specifically, a measurement device for determining squareness of a rod end, such as a fuel rod tube for a nuclear reactor core.

BACKGROUND OF THE INVENTION

In a nuclear reactor, such as a boiling water reactor (BWR), a plurality of elongate fuel rods are laterally spaced apart to form a fuel bundle. The fuel rods are typically cylindrical tubes, each containing nuclear fuel pellets stacked therein, with each tube having solid cylindrical end plugs, or endcaps, fixedly joined, by welding for example, to the ends of the tube to form a closed component.

The several fuel rods are typically configured in a square array, such as an 8 by 8 square array, with the individual fuel rods being spaced from each other by upper and lower tie plates at opposite ends thereof, with a plurality of spacer grids longitudinally spaced apart between the tie plates. The tie plates and grids have individual cells which receive respective ones of the fuel rods for maintaining the lateral spacings between adjacent fuel rods.

Each of the fuel rods is fabricated by cutting a suitable length of tubing to form two ends, with each tube then being conventionally filled with the nuclear fuel pellets. The tube endcaps, which have the same outer diameter as that of the tube, are then joined to the respective ends of the tube and welded thereto. In order to properly align the endcaps with the tube itself, both mating surfaces of the tube end and the endcap must be substantially "square" with the respective mating surfaces being disposed substantially perpendicularly to the longitudinal centerline axis of the tube. If an endcap is not squarely mounted to the tube end for being coextensive therewith, it will be tilted or skewed relative to the tube centerline axis with a portion of the endcap projecting radially outwardly from the outer diameter of the tube itself. The resulting misalignment of the tube endcap and the tube itself affects the accuracy with which the completed tube may be assembled into the fuel bundle, with excessive misalignment of the endcap preventing proper assembly thereof.

Accordingly, during the manufacturing process, squareness of each of the fuel rod ends is conventionally measured to determine whether it is within acceptable tolerances, and if not, the tube end must be remachined to meet required squareness tolerances. One conventional indicator of tube end squareness is called total indicator runout (TIR) which is obtained by placing a conventional dial indicator adjacent to the tube end, with the dial indicator stylus disposed in contact with the tube end generally parallel to the longitudinal centerline axis of the tube. The tube is then rotated about its centerline axis in a conventional jig, with the dial indicator being read to determine the maximum difference in axial position of the tube end between minimum and maximum points thereon, which difference is the TIR reading.

Since each fuel rod is about four meters long and has an outer diameter of about 12 mm, rotating the entire fuel rod about its longitudinal centerline axis requires specialized equipment to prevent damaging the tube itself and forming undesirable scratches in the outer surface thereof. Furthermore, the stylus of the dial indicator necessarily rubs along the tube end as it is rotated which leads to wear of the stylus, and may also possibly damage the rod end.

SUMMARY OF THE INVENTION

A method and apparatus measure squareness of an end of a rod relative to a longitudinal centerline axis thereof without requiring rotation of the rod. The apparatus includes a flat plate mounted substantially perpendicularly to the rod centerline axis. The method positions the plate in abutting contact with the rod end, and a tilt angle of the plate in abutting contact with the rod end is measured for determining squareness of the rod end.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
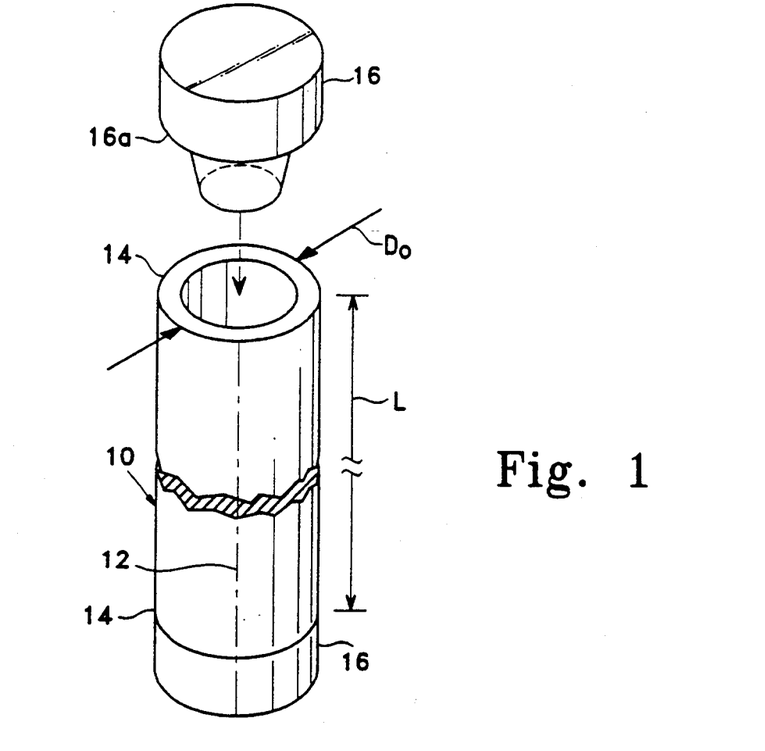
FIG. 1 is an elevational, schematic representation of an exemplary rod in the form of a fuel rod tube for a nuclear reactor, with the tube having opposite ends for receiving endcaps therein.

Illustrated schematically in FIG. 1 is an elongate nuclear fuel rod 10 in the exemplary form of a cylindrical tube, having a longitudinal centerline axis 12 and a pair of opposite annular rod ends 14. The fuel rod 10 has a length L measured between the rod ends 14 of about 4 meters for example, and an outer diameter $D_o$ of about 12 mm for example. The fuel rod 10 conventionally includes a plurality of cylindrical nuclear fuel pellets (not shown) which are vertically stacked on top of each other to substantially fill the rod 10. A pair of conventional end plugs or endcaps 16 are fixedly joined to the respective rod ends 14 by conventional welding for example. Each of the endcaps 16 is a solid, cylindrical member having the same outer diameter as that of the rod 10 and when joined thereto is disposed preferably coextensively therewith for forming a common cylindrical outer surface along the complete length of the rod 10 and the endcaps 16 without undesirable tilting or skewing of the endcaps 16 relative to the rod centerline axis 12.

Figure 2:
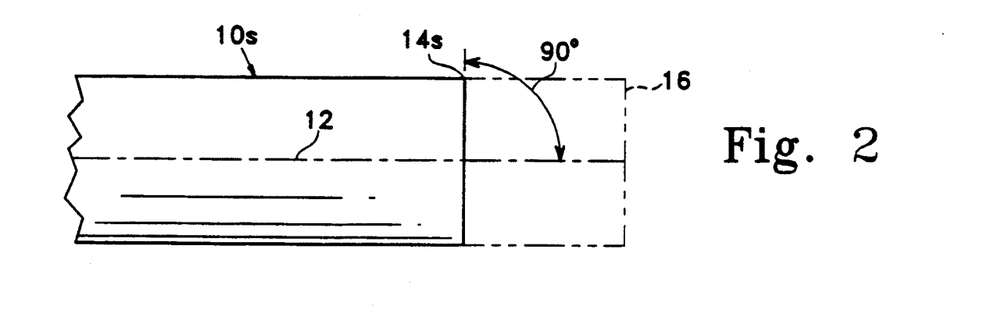
FIG. 2 is a side view of a portion of a fuel rod having a square rod end disposed perpendicularly to a longitudinal centerline axis of the rod.

The endcaps 16 are conventionally machined preferably to have a square annular mating surface 16a which is disposed substantially perpendicularly to the centerline axis of the endcap 16. FIG. 2 illustrates a first, or setup rod 10s having a square rod end 14s, i.e. is disposed substantially perpendicularly to the rod centerline axis 12 at 90° thereto as determined by any conventional method. In this way, when the endcap 16 is joined to the square rod end 14s and coaxially about the centerline axis 12, it will not be skewed relative thereto, and the entire outer surface of the rod 10 and endcap 16 (shown in phantom) will be aligned coextensively with each other and parallel to the centerline axis 12 as illustrated in FIG. 2.

Figure 3:
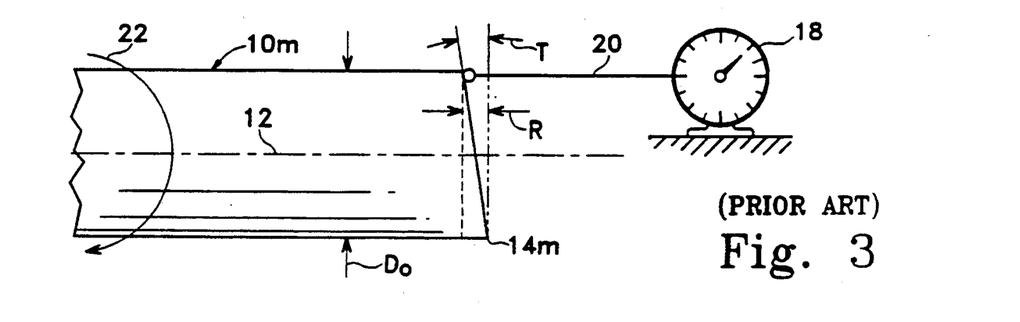
FIG. 3 is a side view of a portion of a fuel rod having an unsquare or tilted rod end, and a conventional dial indicator joined thereto for measuring total indicator runout (TIR) in accordance with the prior art.

Each of the rods 10 is typically machined or cut to size from a longer rod and, therefore, the squareness of the rod ends is typically measured to determine whether or not it falls within acceptable manufacturing tolerances. FIG. 3 illustrates an exemplary one of the fuel rods 10 to be measured, and is therefore designated 10m. The measured rod 10m in this example, has a rod end 14m which is not square or perpendicularly to the centerline axis 12 but is tilted relative to the centerline axis 12 as measured by a tilt angle T from the normal or perpendicular, which tilt angle T is greatly exaggerated in FIG. 3 for clarity of presentation. In order to conventionally measure the squareness of the rod end 14 illustrated in FIG. 3, a conventional, prior art dial indicator 18 is supported adjacent to the rod end 14m and has a stylus 20 which is positioned in abutting contact with the rod end 14m. The rod 10m is conventionally rotated about its centerline axis 12 as indicated by the arrow 22 which causes the stylus 20 to extend and retract relative to the dial indicator 18 as the tilted rod end 14m is rotated. The difference between the maximum and minimum linear measurements as indicated by the dial indicator 18 represents the total indicator runout (TIR) as designated by the reference character R. Accordingly, the runout R is directly proportional to the tilt angle T, and the tilt angle T itself is used in accordance with the present invention to determine squareness of the rod end 14m without rotating the rod 10 itself.

Figure 4:
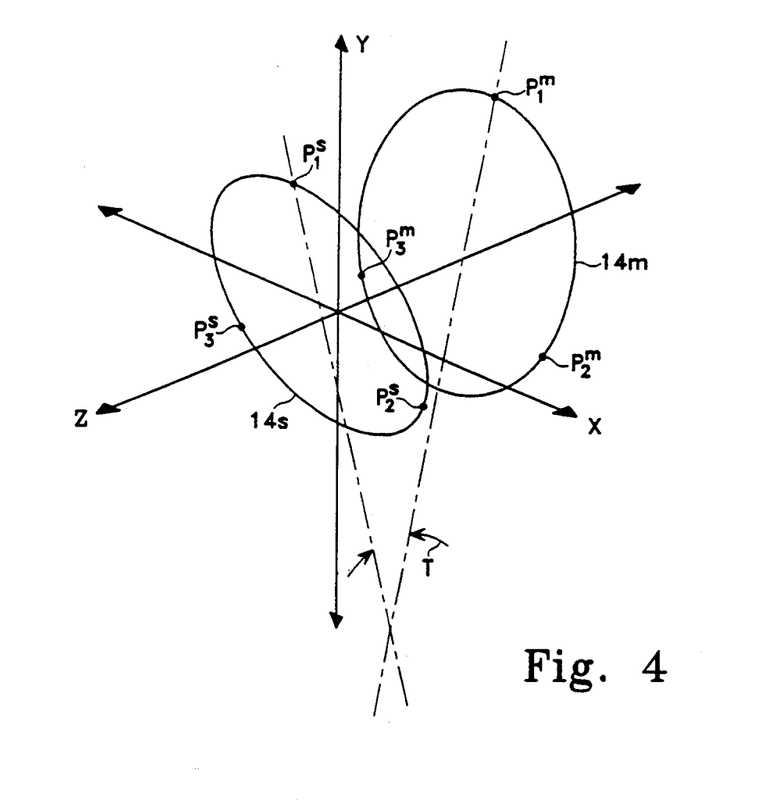
FIG. 4 is a schematic three dimensional cartesian coordinate system illustrating schematically the plane of a setup rod end defined by three points and the plane of a measured rod end defined by three corresponding points.

More specifically, FIG. 4 illustrates schematically a three-dimensional cartesian coordinate system X-Y-Z in which are disposed a first plane representing the square rod end 14s and a second plane representing the measured rod end 14m. Since a plane is represented by at least three points, each of the rod end planes 14s and 14m includes three circumferentially spaced apart points designated $P_1^s$, $P_2^s$, $P_3^s$, and $P_1^m$, $P_2^m$, and $P_3^m$, with the superscripts identifying the respective plane, and the subscripts identifying the respective point. Each of these points is located in the XYZ coordinate system by three values conventionally designated (x, y, z) with respective subscripts 1, 2, and 3 and superscripts s and m. The angle in space between any two planes is represented by a conventional trigonometric equation which expresses the cosine of the included angle designated T, which is analogous to the tilt angle T illustrated in FIG. 3, as a function of the coordinates of the three points $P_1$, $P_2$, $P_3$ in the square rod end plane 14s and the measured rod end plane 14m. Such conventional equation has been modified in accordance with the present invention to form the basis for an improved method and apparatus for measuring the squareness of the rod end 14 based on its tilt angle T, with a tilt angle T of 0° indicating that the rod end 14 is perpendicular to the centerline axis 12 and is therefore square relative thereto, and a non-zero tilt angle T indicating non-squareness of the rod end 14.

Based on this FIG. 4 representation of the two rod end planes 14s and 14m, the angle therebetween, which is designated T to correspond with the tilt angle T of FIG. 3, is represented as follows:

$$\cos(T) = \frac{A_s A_m + B_s B_m + C_s C_m}{\sqrt{(A_s^2 + B_s^2 + C_s^2)} \sqrt{(A_m^2 + B_m^2 + C_m^2)}} \quad (1)$$

Where:

$A_s = (y_2^s - y_1^s)(z_3^s - z_1^s) - (y_3^s - y_1^s)(z_2^s - z_1^s)$ $B_s = (x_3^s - x_1^s)(z_2^s - z_1^s) - (x_2^s - x_1^s)(z_3^s - z_1^s)$ $C_s = (x_2^s - x_1^s)(y_3^s - y_1^s) - (x_3^s - x_1^s)(y_2^s - y_1^s)$ $A_m = (y_2^m - y_1^m)(z_3^m - z_1^m) - (y_3^m - y_1^m)(z_2^m - z_1^m)$ $B_m = (x_3^m - x_1^m)(z_2^m - z_1^m) - (x_2^m - x_1^m)(z_3^m - z_1^m)$ $C_m = (x_2^m - x_1^m)(y_3^m - y_1^m) - (x_3^m - x_1^m)(y_2^m - y_1^m)$

In the above equation, x, y, z represent the measured values of the three points defining the square rod end plane 14s, with the superscript "s" being used merely as an identification device and not as an exponent whereas the superscript "2" is an exponent, and the subscript identifying the respective point; and of the three points defining the measured rod end plane 14m, again with the superscript "m" being used as an identifying device and not as an exponent, and the subscript identifying the respective point.

Equation (1) may be used to determine the tilt angle T between a reference or setup plane which is perpendicular to the rod centerline axis 12, i.e. the square rod end 14s, and the rod end 14 to be measured as represented by the measured rod end 14m. In accordance with a preferred embodiment of the present invention, the first rod 10s illustrated in FIG. 2 having the square rod end 14s is used to provide a reference plane so that the deviation therefrom as represented by the tilt angle T may be more readily and more accurately determined by merely measuring the coordinate positions of the three points defining the measured rod end 14m, and also allows equation (1) to be reduced and simplified.

More specifically, by measuring the rod ends 14 at three predetermined points, and calibrating to zero the respective "z" coordinates of the three points of the square rod end 14s, equation (1) may be reduced to the following form:

$$\cos(T) = \frac{A}{\sqrt{A^2 + B^2 + C^2}} \quad (2)$$

Where:

$A = (x_2 - x_1)(y_3 - y_1) - (x_3 - x_1)(y_2 - y_1)$ $$B = (y_2 - y_1)(z_3^m - z_1^m) - (y_3 - y_1)(z_2^m - z_1^m)$$

$$C = (x_3 - x_1)(z_2^m - z_1^m) - (x_2 - x_1)(z_3^m - z_1^m)$$

In equation (2), the respective coordinates x, y do not utilize the identifying superscripts s, m since these coordinates have identical constant values as represented by the positions of three z-displacements sensors as described hereinbelow which need be measured only once. And, since these three sensors are preferably calibrated to zero before measuring each rod end 14, each of the z coordinate values $z_1$, $z_2$, and $z_3$ for the square rod end plane 14s is zero and is no longer required in the equation. Equation (2), therefore, merely requires the measuring of the three coordinate $z_1^m$, $z_2^m$, and $z_3^m$ of the three points on the measured rod end 14m. In other words, equation (2) merely represents the cosine of the tilt angle T of the measured rod end 14m relative to a perpendicular or square reference rod end 14s. If the measured rod end 14m itself is square, the tilt angle T will be zero which indicates that the measured rod end 14m is parallel to the reference square rod end 14s. By referencing the measured rod end 14m relative to a predetermined square rod end 14s, manufacturing alignment inaccuracies of the measuring apparatus will not affect the accuracy of measuring rod end squareness.

Figure 5:
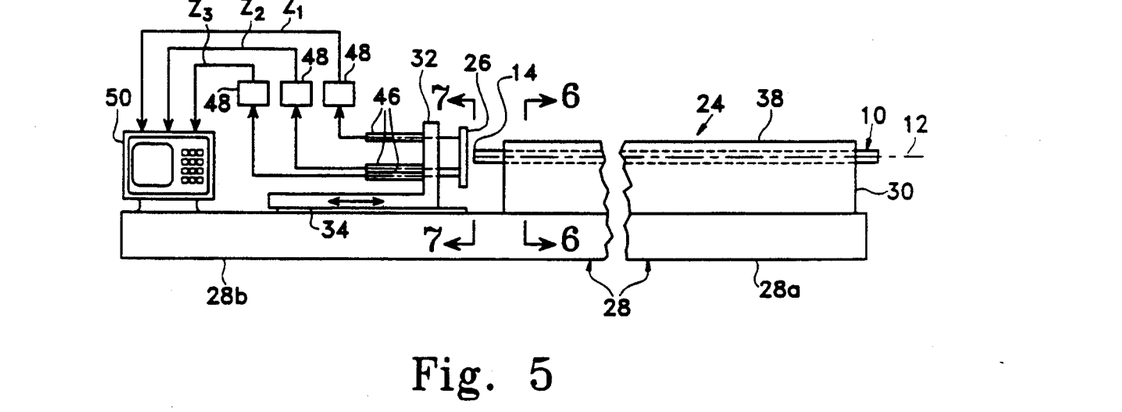
FIG. 5 is an elevation, schematic representation of an exemplary apparatus for measuring squareness of a rod end such as those shown in FIGS. 1–3 including a carriage for supporting the rod and a carriage for supporting a flat plate for measuring rod end squareness.

More specifically, the above concept as represented by equation (2) may be utilized to define an apparatus 24 as shown schematically in an exemplary embodiment in FIG. 5 for measuring squareness of the end 14 of the rod 10 such as that shown in FIG. 1 relative to the longitudinal centerline axis 12. The apparatus 24 includes a planar or flat measuring plate 26, and means for elastically mounting the plate 26 adjacent to the rod end 14 and substantially perpendicularly to the rod centerline axis 12. Means are also provided for translating the plate 26 in abutting contact with the rod end 14 so that the plate 26 conforms to the orientation of the rod end 14. Means are also provided for measuring the tilt angle T of the plate 26 while it is in abutting contact with the rod end 14 relative to the centerline axis 12 to determine squareness of the rod end 14 as represented by its tilt, if any.

As shown in FIG. 5, the mounting means of the apparatus 24 includes an elongate frame 28 having first and second opposite ends 28a and 28b, and a preferably stationary rod carriage 30 is fixedly joined to the frame 28 adjacent the frame first end 28a for supporting one of the rods 10 substantially horizontally therein. The mounting means also includes a plate carriage 32 which is preferably movable or translatable along the frame 28 and is preferably slidably joined thereto adjacent the frame second end 28b, with the plate 26 being joined to the plate carriage 32 substantially perpendicularly to the rod centerline axis 12. In accordance with the present invention, the plate 26 is translated substantially parallel to the rod centerline axis 12 for contacting the rod end 14 which may be accomplished by moving either the rod carriage 30 toward the plate 26 or moving the plate carriage 32, including the plate 26, toward the rod end 14. In the preferred embodiment illustrated in FIG. 5, the rod carriage 30 is fixedly joined to the frame 28, and the translating means includes one or more conventional slide supports 34 joining the bottom of the plate carriage 32 to the top of the frame 28 for effecting only translation movement of the plate carriage 32, and in turn the plate 26, toward the rod end 14 for obtaining abutting contact therewith.

Figure 6:
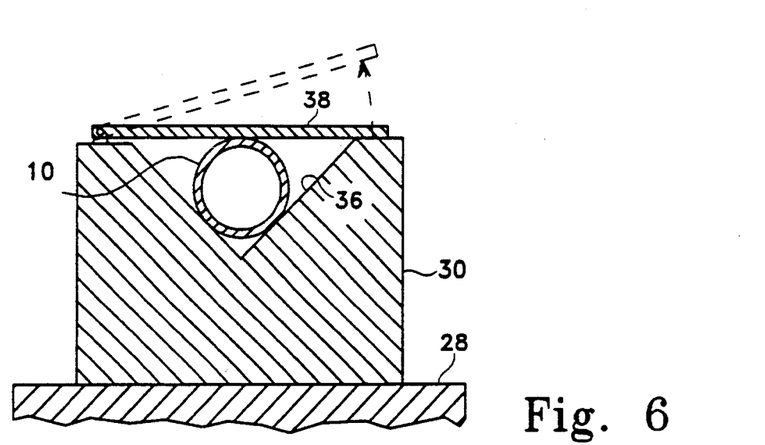
FIG. 6 is a transverse sectional view of the rod carriage of the measuring apparatus illustrated in FIG. 5 and taken along line 6—6.

FIG. 6 illustrates in more particularity an exemplary embodiment of the rod carriage 30 which may include a simple V-shaped elongate groove 36 in the top thereof in which one of the fuel rods 10 may be simply supported. Friction caused by the weight of the fuel rod 10 itself may be adequate for preventing longitudinal sliding movement of the fuel rod 10 within the groove 36, with the V-groove configuration preventing transverse movement thereof. If desired, a suitable clamp 38 in the form of an elongate plate hinged along one edge may be joined to the top of the rod carriage which is openable for allowing insertion and withdrawal of the rod 10, and closable for clamping the rod 10 in the groove 36 for preventing any movement thereof.

Figure 7:
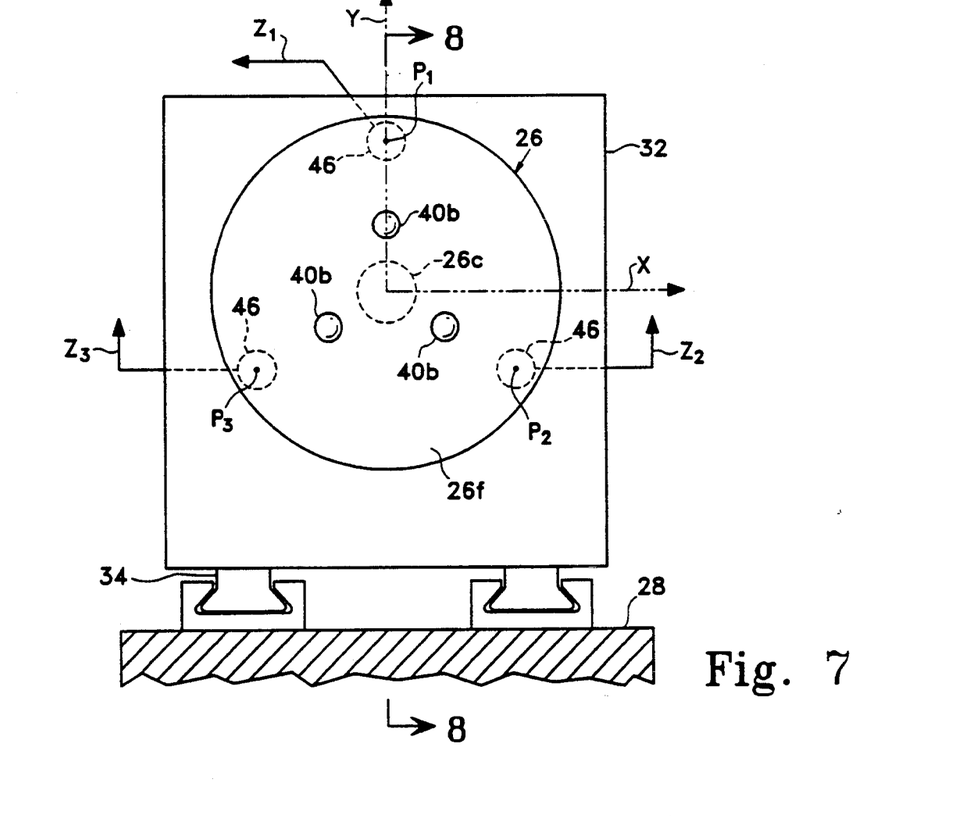
FIG. 7 is a transverse view of the plate carriage of the measuring apparatus illustrated in FIG. 5 and taken along line 7—7.

FIG. 7 illustrates an end view of the plate 26 mounted to the plate carriage 32. The plate carriage 32 is conventionally mounted to the top of the frame 28 by a pair of the slide supports 34 each of which is in the form of a generally T-shaped rail fixedly joined to the bottom of the carriage 32 which fits in a complementary T-shaped groove formed integrally with the top of the frame 28 for allowing the carriage 32 to be manually or automatically pushed and translated along the slide supports 34 for positioning the plate 26 in abutting contact with the rod end 14.

Figure 8:
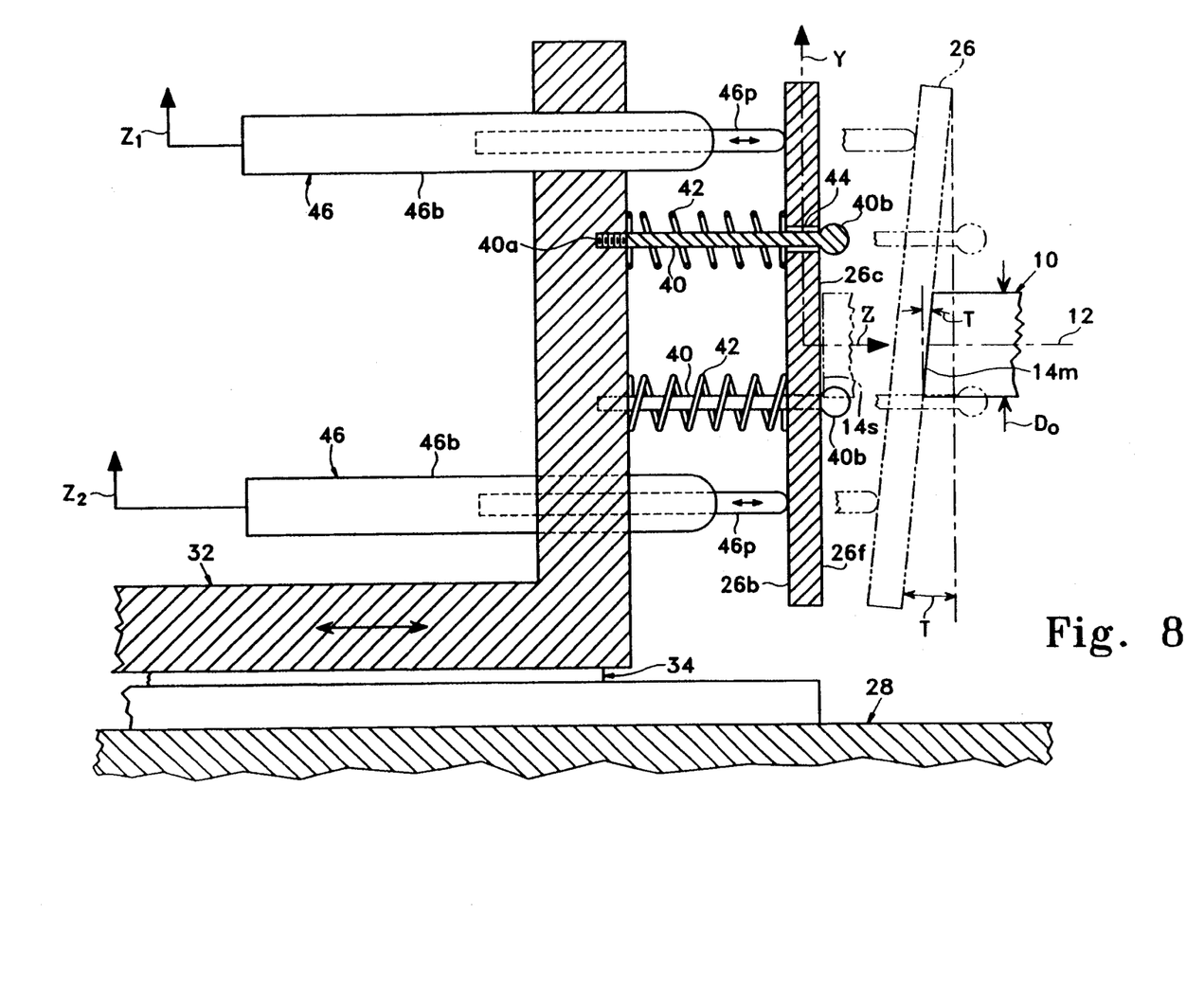
FIG. 8 is a longitudinal, partly sectional view of the plate and its carriage taken along line 8—8 of FIG. 7.

More specifically, FIGS. 7 and 8 illustrate in more particularity the translating means which includes three retainer bolts 40 fixedly joined at proximal ends 40a to the side of the plate carriage 32, each having an enlarged, preferably spherical head 40b at its distal end. Three compression springs 42 are provided, with each spring 42 being disposed around a respective one of the retainer bolts 40. The plate 26 includes front and back opposite sides 26f and 26b, respectively, and a circular center portion 26c on the front side 26f as shown in more particularity in FIG. 7, for abutting contact with the rod end 14 as shown in more particularity in FIG. 8.

The plate 26 further includes three through apertures 44 spaced circumferentially around the center portion 26c through which are disposed the three retainer bolts 40, respectively, with the respective springs 42 being disposed in compression between the plate carriage 32 and against the plate back side 26b for biasing the plate 26 longitudinally away from the carriage 32. The bolt heads 40b are disposed against the plate front side 26f for preventing removal of the plate 26 from the bolts 40 so that the plate 26 is translatable on the retainer bolts 40 to further compress the springs 42 as the plate 26 is translated in abutting contact against the stationary rod end 14.

As shown in FIG. 8, the three bolts 40 preferably have equal lengths for mounting the plate 26 vertically and substantially perpendicularly to the rod centerline axis 12. The plate apertures 44 allow the plate 26 to translate along the bolts 40 toward the carriage 32 with different amounts of translation on the respective bolts 40 so that the plate 26 is also tiltable on the retainer bolts 40 to conform with any deviation, or tilting of the rod end 14 from the normal or perpendicular to the rod centerline axis 12. As shown in solid line in FIG. 8, the plate 26 can be oriented vertically and perpendicularly to the rod centerline axis 12, and as shown in phantom line, the plate 26 may tilt at the tilt angle T to conform with the respective tilt angle T of a nonsquare rod end 14, e.g. of the measured rod end 14m. In this way, the plate 26 itself may be used to measure the tilt angle T of the rod end 14 by abutting the plate 26 against the rod end 14 and measuring the tilt angle T of the plate 26, while it is in abutting contact with the rod end 14, relative to the rod centerline axis 12 to determine the squareness of the rod end 14. Since the plate 26 is elastically joined to the plate carriage 32 by the bolts 40 and compression springs 42, it is free to tilt in space over a predetermined range so that as the carriage 32 is translated toward the rod end 14, the plate 26 will additionally compress the springs 42 as the plate 26 tilts to the tilt angle T to conform with any tilt of the rod end 14. In this way, the fuel rod 10 may remain stationary and is not required to be rotated as in the prior art, with the tiltable plate 26 being used to provide an indication of the tilt angle T of the rod end 14.

Since the plate 26 represents a single plane, measuring its tilt angle T may be accomplished by measuring three circumferentially spaced apart linear positions or displacements of the plate 26, and determining therefrom the tilt angle T of the plate 26 relative to the normal or perpendicular to the rod centerline axis 12, which in turn provides a measurement for the tilt angle T of the rod end 14. Accordingly, the measuring means preferably includes three conventional linear displacement sensors 46 as shown in FIGS. 5, 7, and 8 each having a body 46b, as shown in FIG. 8, fixedly joined to the plate carriage 32, for example by extending through the side surface thereof adjacent to the plate 26, with each sensor 46 also having an extendable probe 46p in the form of an elongate rod which is disposed in abutting contact with the plate back side 26b for measuring linear displacement of a corresponding point on the plate 26 relative to the plate carriage 32. Each sensor 46 measures the linear position at the end of the probe 46p relative to the body 46b in a conventional manner, with the sensor 46 taking the form of a conventional linear variable differential transformer such as that sold under the trade name "Sonygage" available from the Wren Machining Tools Company. As shown in FIG. 7, the sensors 46 and their respective probes 46p are preferably spaced circumferentially apart from each other around the plate center portion 26c and preferably near the outer perimeter of the plate 26 so that any difference in measurement of the sensors 46 is exaggerated or amplified by its distance from the centerline axis 12 and is therefore more indicative of tilting of the plate 26, and in turn is indicative of squareness of the rod end 14 in conforming, abutting contact with the plate center portion 26c.

As shown in FIG. 8, the sensor bodies 46b are fixedly joined to the plate carriage 32, with the probes 46p being urged against the plate back side 26b by conventional springs disposed in the sensor bodies 46b (not shown) so that when the plate 26 is tilted in abutting contact with a nonsquare rod end 14, such as the measured rod end 14m, the several sensors 46 will provide electrical signals indicative of the respective three displacements of the probes 46p. As shown in FIGS. 7 and 8, a XYZ coordinate system is superimposed on the plate 26 and is analogous to the XYZ coordinate system illustrated in FIG. 4. The Z-axis is disposed perpendicularly outwardly from the plate front side 26f from the center of the center portion 26c and is disposed preferably parallel to the rod centerline axis 12. The Y-axis extends vertically, and the X-axis extends horizontally as shown in FIG. 7. Referring again to FIG. 8, the respective displacements of the three probes 46p along or parallel to the Z-axis are indicative of the tilt angle T of the plate 26. If the plate 26 is accurately assembled to the carriage 32 so that it is exactly perpendicular to the rod centerline axis 12, the actual displacement readings of the sensors 46 along or parallel with the Z-axis may be taken initially to correspond with the $z_1$, $z_2$, and $z_3$ readings with the superscript "s" associated with equation (1), and then second readings thereof may be taken when the plate 26 abuts the rod end 14m as illustrated in phantom line in FIG. 8 which correspond with the $z_1$, $z_2$, and $z_3$ readings associated with the "m" superscript in equation (1) which may then be solved for determining the cosine of the tilt angle T, the inverse of which is the actual tilt angle T.

However, in order to simplify the equation (1) to that shown in equation (2), and for improving accuracy of determining the tilt angle T of the rod end 14, the apparatus 24 is preferably used by firstly positioning the plate 26 against a reference or setup rod having a square rod end such as the first rod 10s illustrated in FIG. 2 having the square rod end 14s which has a substantially zero tilt angle T, and then measuring the three linear displacements $z_1^s$, $z_2^s$, and $z_3^s$ using the three sensors 46, with the plate 26 being positioned in abutting contact with the square rod end 14s, such as the one shown in phantom in FIG. 8. These three initial readings will therefore be indicative of the square rod end 14s, and therefore may be used as reference values.

As shown in FIG. 5, however, each of the sensors 46 is conventionally provided with a respective digital central processing unit (CPU) 48 for providing a calibrated output from the sensor 46 in suitable linear units. The CPUs 48 conventionally have a zero reset button which may be pressed so that the three initial values of the linear displacements upon measuring the square rod end 14s may be set to zero. In this way, any misalignment between the plate 26 relative to the fuel rod 10 supported in the rod carriage 30 is removed from the measuring method. The first rod 10s may then be removed from the rod carriage 30 and then the fuel rod 10 to be measured, such as the second fuel rod 10m illustrated in FIG. 3 may be loaded into the rod carriage 30. The plate 26 is then positioned against the rod end 14m of the second rod 10m, and the sensors 46 are again used for measuring the three z-positions of the plate 26 at the probes 46p which represents respective differences in the three z-displacements relative to the square rod end 14s initially measured. In this way, the relative position or tilt of the second-rod end 14m is measured relative to that of the first-rod end 14s to determine the differential tilt angle T therebetween.

The measuring apparatus 24 as illustrated in FIG. 5, therefore, preferably also includes a conventional programmable digital computer 50 in which may be conventionally programmed equation (2), which computer 50 is operatively joined to the three sensors 46 for receiving therefrom the respective $z_1$, $z_2$, and $z_3$ signals indicative of the respective three displacements of the plate 26 as measured at the probes 46p, with the computer 50 then being programmed to calculate the squareness of the rod end 14m based on the tilt angle T of the plate 26 from the three z-displacements.

FIG. 7 illustrates the location of the three sensors 46 and identifies the three points $P_1$, $P_2$, and $P_3$ on the plate 26 whose displacement along or parallel with the Z axis is being measured by the sensors 46. Since the three sensors 46 are fixed in space relative to the X and Y axes, the respective x, y coordinates associated with each of the three points $P_1$, $P_2$, and $P_3$ are constants which may be conventionally measured relative to the origin junction of the X and Y axes a illustrated in FIG.

7, with the respective x and y values thereof being provided as constants in the A, B, and C parameters of equation (2). The only remaining variables in the parameters of equation 2 are $z_1^m$, $z_2^m$, and $z_3^m$ which are provided directly by the respective sensors 46 to the computer 50. The computer 50 may, therefore, automatically calculate the value of the cosine of the tilt angle T as represented by the now complete equation 2, and the inverse cosine of that value may be used to provide the value of the tilt angle T itself. However, in the preferred embodiment of the present invention, and referring to FIG. 3, the tilt angle T may be used to determine the total runout R as represented by the following expression:

$$R = D_o \times \text{Tan}(T)$$

By basic trigonometry, the runout R, which is equal to the total indicator runout (TIR) which would otherwise be obtained from the dial indicator 18 illustrated in FIG. 3, may be obtained by the product of the fuel rod outer diameter $D_o$ and the tangent of the tilt angle T. The tangent of the tilt angle T is conventionally equal to $(1 - \text{Cos}(T))/\text{Cos}(T)$, with the value of the cosine of the tilt angle T being provided from the expression in equation (2) which is obtained from the simple measurement of the three z-axis positions of the three sensors 46 abutting the plate 26. Accordingly, the computer 50 may be programmed to calculate a squareness parameter of the rod end 14 representative of the total indicator runout (TIR), or the dimension R, as being equal to the product of the fuel rod outer diameter $D_o$ and the tangent of the tilt angle T.

Accordingly, by utilizing the conventionally known expressions for the angle between two planes in space as represented by equation (1) and as shown in FIG. 4, the measuring apparatus 24 of the present invention allows squareness of the fuel rod ends 14 to be simply and accurately measured without rotating the fuel rod 10, but by merely measuring the tilt angle T of the rod end 14. The plate 26 elastically supported by the springs 42 allows the plate 26 to conform to the tilt angle T of the rod end 14 by being positioned in abutting contact therewith which minimizes the possibility of damage thereto, with the tilt angle T of the rod end 14 being indirectly measured by the corresponding tilt angle T of the plate 26 itself. The initial use of the square rod end 14s provides a reference for yet further improving accuracy of measuring the squareness of the measured rod ends 14m by eliminating assembly stackup tolerance errors in the several components forming the measuring apparatus 24. As long as the respective fuel rods 10 are accurately positioned in the rod carriage 30, and the plate carriage 32 is repeatably translated in contact with the rod ends 14, accurate measurement of the rod end squareness may be obtained.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An apparatus for measuring squareness of an end of a cylindrical rod relative to a longitudinal centerline axis thereof comprising:
   a flat plate;
   means for mounting said plate adjacent to said rod end and substantially perpendicularly to said rod centerline axis;
   means for translating said flat plate such that a front side of said flat plate is in abutting contact with said rod end; and
   plural sensor means engageable with a back side of said flat plate for measuring a tilt angle of said plate in abutting contact with said rod end relative to said rod centerline axis to determine said squareness of said rod end.

2. An apparatus according to claim 1 wherein said mounting means comprises:
   a frame having first and second opposite ends;
   a rod carriage joined to said frame adjacent said frame first end for supporting said rod therein; and
   a plate carriage joined to said frame adjacent said frame second end, with said flat plate being joined thereto substantially perpendicularly to said rod centerline axis.

3. An apparatus according to claim 2 wherein said rod carriage is fixedly joined to said frame and said translating means comprises:
   a slide support joining said plate carriage to said frame for effecting translation movement of said plate carriage and in turn said flat plate toward said rod end;
   three retainer bolts fixedly joined at proximal ends thereof to said plate carriage, and having enlarged heads at distal ends thereof;
   three compression springs, each disposed around a respective one of said retainer bolts; and wherein said front side of said plate includes a center portion for abutting contact with said rod end, and three apertures spaced circumferentially around said center portion through which are disposed said retainer bolts, and springs being disposed against said back side of said flat plate, and said bolt heads being disposed against said front side of said flat plate so that said flat plate is translatable on said retainer bolts to further compress said springs as said flat plate is translated in abutting contact against said rod end, with said flat plate also being tiltable on said retainer bolts to conform with deviation of said rod end from perpendicular to said rod centerline axis.

4. An apparatus according to claim 3 wherein said sensor means comprises three displacement sensors, each having a body fixedly joined to said plate carriage, and each having an extendable probe disposed in abutting contact with said back side of said flat plate for measuring linear displacement of said flat plate relative to said plate carriage as said plate is translated on said retainer bolts, said probes being spaced circumferentially apart from each other around said plate center portion so that any difference in measurement of said sensors is indicative of tilting of said flat plate, and in turn is indicative of squareness of said rod end in abutting contact with said plate center portion.

5. An apparatus according to claim 4 wherein said measuring means further comprises a computer operatively joined to said three sensors for receiving therefrom signals indicative of said respective three displacements; said computer being effective to calculate said squareness of said rod end based on said tilt angle of said flat plate from said three displacements.

6. A method for measuring squareness of an end of a cylindrical rod relative to a longitudinal centerline axis thereof comprising the steps of:
positioning a flat plate such that a front side of said flat plate is in abutting contact with said rod end; and
measuring plural circumferentially spaced apart linear positions of a back side of said flat plate and determining therefrom a tilt angle of said plate in abutting contact with said rod end relative to said rod centerline axis to determine said squareness of said rod end.

7. A method according to claim 6 wherein said measuring step comprises measuring three circumferentially spaced apart linear positions of said flat plate and determining therefrom a tilt angle of said flat plate relative to perpendicular to said rod centerline axis.

8. A method according to claim 7 further comprising:
firstly positioning said front side of said flat plate against a square rod end of a first rod having substantially zero tilt, and measuring said three displacements; and
secondly positioning said front side of said flat plate against a rod end of a second rod, and measuring respective differences in said three displacements for said plate abutting said second-rod end over said flat plate abutting said first-rod end to determine said tilt angle.

9. A method according to claim 8 wherein said rod end has an outer diameter, and further comprising calculating a squareness parameter being equal to the product of said outer diameter and the tangent of said tilt angle.

* * * * *